US012562380B2

(12) United States Patent
   Liu et al.

(10) Patent No.: US 12,562,380 B2
(45) Date of Patent: Feb. 24, 2026

(54) LAYERED OXIDE CATHODE MATERIAL AND A PREPARATION METHOD THEREOF, A CATHODE SHEET, AND A SODIUM ION BATTERY

(71) Applicant: HUBEI WANRUN NEW ENERGY TECHNOLOGY CO., LTD., Hubei (CN)

(72) Inventors: Shiqi Liu, Hubei (CN); Xin Su, Hubei (CN); Kunfang Wang, Hubei (CN); Ruiling Xu, Hubei (CN); Tangping Peng, Hubei (CN); Fei Lv, Hubei (CN)

(73) Assignee: HUBEI WANRUN NEW ENERGY TECHNOLOGY CO., LTD., Hubei (CN)

( * ) Notice: Subject to any disclaimer, the term of this patent is extended or adjusted under 35 U.S.C. 154(b) by 57 days.

(21) Appl. No.: 18/729,864

(22) PCT Filed: May 29, 2024

(86) PCT No.: PCT/CN2024/096140
   § 371 (c)(1),
   (2) Date: Jul. 17, 2024

(87) PCT Pub. No.: WO2025/245747
   PCT Pub. Date: Apr. 12, 2025

(65) Prior Publication Data
   US 2026/0005224 A1 Jan. 1, 2026

(51) Int. Cl.
   *H01M 4/36* (2006.01)
   *C01G 53/50* (2025.01)
   (Continued)

(52) U.S. Cl.
   CPC ............ *H01M 4/366* (2013.01); *C01G 53/50* (2013.01); *H01M 4/505* (2013.01); *H01M 4/525* (2013.01);
   (Continued)

(58) Field of Classification Search
   CPC ...................................................... H01M 4/366
   See application file for complete search history.

(56) References Cited

FOREIGN PATENT DOCUMENTS

| | | |
|---|---|---|
| CN | 110277540 A | 9/2019 |
| CN | 113644268 A | 11/2021 |

(Continued)

OTHER PUBLICATIONS

The search report of counterpart PCT application No. PCT/CN2024/096140 issued on Feb. 5, 2025.
(Continued)

*Primary Examiner* — Barbara L Gilliam
(74) *Attorney, Agent, or Firm* — The Sun IP Law

(57) ABSTRACT

The present disclosure provides a layered oxide cathode material and a preparation method thereof, a cathode sheet, and a sodium ion battery, and belongs to the technical field of sodium ion batteries. The layered oxide cathode material includes an O3@P2-phase composite oxide particle and an inert coating layer coated on its surface, and the O3@P2-phase composite oxide particle includes an O3-phase nickel-manganese-based oxide layered particle and a P2-phase metal oxide coating layer coated on the surface of the O3-phase nickel-manganese-based oxide layered particle; and the inert coating layer is a carbon layer and/or an inorganic metal oxide layer. When the layered oxide cathode material provided by the present disclosure is applied to the sodium ion battery, the prepared sodium ion battery has high initial coulombic efficiency, excellent rate performance, long cycle life, and good air stability.

12 Claims, 2 Drawing Sheets

(51) Int. Cl.
    *H01M 4/505*       (2010.01)
    *H01M 4/525*       (2010.01)
    *H01M 10/054*     (2010.01)

(52) U.S. Cl.
    CPC ....... *H01M 10/054* (2013.01); *C01P 2002/50* (2013.01); *C01P 2004/61* (2013.01); *C01P 2004/84* (2013.01); *C01P 2006/11* (2013.01); *C01P 2006/12* (2013.01); *C01P 2006/40* (2013.01)

(56)              References Cited

FOREIGN PATENT DOCUMENTS

| | | | | |
|---|---|---|---|---|
| CN | 115520910 A | * | 12/2022 | .......... H01M 10/054 |
| CN | 116130617 A | | 5/2023 | |
| CN | 116364891 A | * | 6/2023 | ............ H01M 4/366 |
| CN | 117080404 A | | 11/2023 | |
| CN | 117913264 A | | 4/2024 | |
| WO | 2024042060 A1 | | 2/2024 | |
| WO | 2024066064 A1 | | 4/2024 | |

OTHER PUBLICATIONS

The first office action of counterpart CN application No. 202410671665.9 issued on Sep. 18, 2024.

* cited by examiner

LAYERED OXIDE CATHODE MATERIAL AND A PREPARATION METHOD THEREOF, A CATHODE SHEET, AND A SODIUM ION BATTERY

CROSS-REFERENCE TO RELATED APPLICATION

The present disclosure is a National Stage of International Patent Application No. PCT/CN2024/096140 filed on May 29, 2024, which claims the benefit of priority to Chinese Application No. 202410671665.9 filed on May 27, 2024, the disclosure of which is hereby incorporated by reference in its entirety.

TECHNICAL FIELD

The present disclosure relates to the technical field of sodium ion batteries, in particular to a layered oxide cathode material and a preparation method thereof, a cathode sheet, and a sodium ion battery.

BACKGROUND

Lithium ion batteries are already widely used in fields such as electric vehicles, consumer electronics, and energy storage, but it faces problems such as low lithium resource reserves, uneven distribution, and large price fluctuations, which seriously restrict its large-scale applications. Compared to lithium resources, sodium resources are widely distributed and easily obtained in the earth's crust, thus sodium ion batteries have more cost advantages and are expected to be widely applied in the field of energy storage.

The sodium ion batteries and the lithium ion batteries have similar working principles, and the sodium ion batteries utilize the extraction and insertion of sodium ions between cathodes and anodes to achieve energy storage and release. At present, main cathode materials for the sodium ion batteries include layered transition metal oxides, poly-anionic compounds, and prussian blue analogues, herein the layered transition metal oxide cathode materials have the highest sodium storage specific capacity, and attract more and more researches and attentions. Herein, according to the sodium ion coordination environment and interlayer stacking order, the layered transition metal oxides may be mainly divided into P2 and O3 types, the English letters P and O represent the sodium ion coordination environment as a triangular prism and an octahedron respectively, and the numbers 2 and 3 represent the interlayer stacking order as ABBA and ABCABC respectively. Herein, a P2-phase material is a sodium poor phase (usually the sodium content is less than 0.67), and when it is used to produce the sodium ion batteries, the initial charging capacity of the sodium ion batteries produced is relatively low, an additional sodium supplementation process is required, and it is not beneficial for practical applications; and an O3-phase material is a sodium rich phase (usually the sodium content is close to 1.0), and when it is used to produce the sodium ion batteries, the sodium ion batteries produced have high charging and discharging capacities. Therefore, the O3-phase materials have the potential to become commercial cathode materials for the sodium ion batteries. However, the sodium element rich in the O3-phase cathode material is prone to react with water and carbon dioxide in the air, so that the material surface is relatively high in residual alkali content, and the formation of substances with poor conductivity such as sodium carbonate, sodium hydroxide, and sodium bicarbonate may affect the initial coulombic efficiency and reversible capacity and the like of the sodium ion batteries prepared.

Based on this, how to eliminate or effectively utilize the residual alkali on the surface of the O3-phase layered oxide sodium ion battery cathode material and improve the air stability of the O3-phase layered oxide sodium ion battery cathode material is an urgent technical problem to be solved in this field.

SUMMARY

A main purpose of the present disclosure is to provide a layered oxide cathode material and a preparation method thereof, a cathode sheet, and a sodium ion battery, as to solve the problem of poor electrochemical performance of sodium ion batteries caused by poor air stability and residual alkali of sodium ion battery cathode materials in existing technologies.

In order to achieve the above purpose, a first aspect of the present disclosure provides a layered oxide cathode material, the layered oxide cathode material includes an O3@P2-phase composite oxide particle and an inert coating layer coated on the surface of the O3@P2-phase composite oxide particle, and the O3@P2-phase composite oxide particle includes an O3-phase nickel-manganese-based oxide layered particle and a P2-phase metal oxide coating layer coated on the surface of the O3-phase nickel-manganese-based oxide layered particles; and the inert coating layer is a carbon layer and/or an inorganic metal oxide layer.

In technical schemes of embodiments of the present disclosure, a layered oxide cathode material with a double-layer coating structure is provided to address defects in existing sodium ion battery cathode materials, herein the P2-phase metal oxide coating layer reduces the residual alkali content on the surface of the O3-phase nickel-manganese-based oxide layered particle and provides a good transport channel for sodium ions, and the inert coating layer delays side reactions between the outer surface of the layered oxide cathode material and the air and electrolyte, thereby the residual alkali content on the surface of the oxide material is significantly reduced, and the air stability is improved.

Further, a molecular formula of the O3-phase nickel-manganese-based oxide layered particle is $Na_xNi_aMn_bM1_cO_2$, herein $0.8 \leq x \leq 1.0$, $a+b+c=1.0$, $a$, $b$, and $c$ are all positive numbers, and M1 is selected from one or more of Fe, Ti, Mg, Cu, Al, Ca, Zn, and Co; and preferably, the M1 is selected from one or more of Fe, Ti, Mg, Cu, Zn, and Ca.

In this embodiment, the inventors select and optimize the types of the O3-phase nickel-manganese-based oxide layered particle by extensive experiments, and it is discovered that when its components are based on the element composition in the above molecular formula and the stoichiometric ratio, the air stability of the O3-phase nickel-manganese-based oxide layered particle obtained is further improved. At the same time, the O3-phase nickel-manganese-based oxide layered particle may also be better compatible and coordinated with the P2-phase metal oxide coating layer.

Further, a molecular formula of the P2-phase metal oxide coating layer is $Na_yM2O_2$, herein $0.6 \leq y \leq 0.8$, and M2 is selected from one or more of Ni, Mn, Fe, Ti, Mg, Cu, Al, Ca, and Co; and preferably, the M2 is selected from one or more of Fe, Mn, Mg, Cu, and Ca.

In this embodiment, the inventors select and optimize the types of the P2-phase metal oxide coating layer by extensive experiments, and it is discovered that when its components are based on the element composition in the above molecular formula and the stoichiometric ratio, it may better reduce the residual alkali content on the surface of the O3-phase nickel-manganese-based oxide layered particle and effectively improve the air stability of the P2-phase metal oxide coating layer.

Further, the inorganic metal oxide layer is selected from one or more of $Al_2O_3$ layer, $TiO_2$ layer, CuO layer, and MgO layer; and preferably, the inorganic metal oxide layer is selected from one or more of $Al_2O_3$ layer, $TiO_2$ layer, and MgO layer.

In this embodiment, compared to the inorganic metal oxide layers formed by other metals, the structures of the above inorganic metal oxide layers are more stable and may better suppress side reactions between the O3@P2-phase composite oxide particle and electrolyte. On this basis, the inventor further selects the inorganic metal oxide layer preferably from one or more of the $Al_2O_3$ layer, $TiO_2$ layer, and MgO layer, and it is discovered that these inorganic metal oxide layers may better coordinate with the P2-phase metal oxide coating layer preferably selected above, while the cost is also low, and the added value of the layered oxide cathode material prepared may be effectively improved.

Further, the M1 in the O3-phase nickel-manganese-based oxide layered particle is Ti, and the M2 in the P2-phase metal oxide coating layer is selected from one or more of Fe, Cu, and Mn; alternatively, the M1 in the O3-phase nickel-manganese-based oxide layered particle is Cu or Ti and Cu, and the M2 in the P2-phase metal oxide coating layer is selected from one or more of Mg, Cu and Mn.

In this embodiment, the inventors, by extensive experiments and comparisons, discover that when the M2 in the P2-phase metal oxide coating layer and the M1 in the O3-phase nickel-manganese-based oxide layered particle are combined in the above way, the P2-phase metal oxide coating layer may better combine with the O3-phase nickel-manganese-based oxide layered particle. At the same time, the residual alkali on the surface of the O3-phase nickel-manganese-based oxide may be more effectively eliminated, thereby the air stability of the layered oxide cathode material obtained is improved.

Furthermore, the molecular formula of the O3-phase nickel-manganese-based oxide layered particle is $NaNi_{0.5}Mn_{0.4}Ti_{0.1}O_2$, the molecular formula of the P2-phase metal oxide coating layer is $Na_{9/7}Cu_{2/9}Fe_{1/9}Mn_{2/3}O_2$, and the inert coating layer is the $Al_2O_3$ layer; alternatively, the molecular formula of the O3-phase nickel-manganese-based oxide layered particle is $NaNi_{0.45}Mn_{0.4}Ti_{0.1}Cu_{0.05}O_2$, the molecular formula of the P2-phase metal oxide coating layer is $Na_{0.6}Mg_{0.15}Cu_{0.15}Mn_{0.7}O_2$, and the inert coating layer is the carbon layer.

In this embodiment, when the O3-phase nickel-manganese-based oxide layered particle as the core, the P2-phase metal oxide coating layer as the first coating layer, and the inert coating layer as the second coating layer in the layered oxide cathode material are set according to the above two ways, the layered oxide cathode material obtained not only has excellent electrochemical performance and higher air stability, but also may better meet its practical application needs.

Further, in the layered oxide cathode material, the thickness of the P2-phase metal oxide coating layer is 2 nm-100 nm, and the thickness of the inert coating layer is 2 nm-100 nm; preferably, calculated by using the weight of the layered oxide cathode material as 100%, a mass fraction of the P2-phase metal oxide coating layer is 0.5%-5%, and a mass fraction of the inert coating layer is 0.5%-5%; and preferably, a coverage rate of the P2-phase metal oxide coating layer on the surface of the O3-phase nickel-manganese-based oxide layered particle is 80%-100%, and a coverage rate of the inert coating layer on the surface of the O3@P2-phase composite oxide particle is 80%-100%.

In this embodiment, when the thicknesses of the two coating layers are within the above ranges, it may better balance between suppressing the side reactions, consuming the residual alkali, and improving the conductivity, thereby the electrochemical performance of the cathode material is improved better. When the two coating layers are set respectively according to the above weight ratios, the better coordination and mass transfer may be achieved between the coating layers, as well as between the P2-phase metal oxide coating layer and the core particles, and the electrochemical performance of the cathode material obtained is also higher. In addition, in a plurality of typical implementation modes, the coverage rate of the P2-phase metal oxide coating layer on the surface of the O3-phase nickel-manganese-based oxide layered particle is 80%-100%; and the coverage rate of the inert coating layer on the surface of the O3@P2-phase composite oxide particle is 80%-100%. In the structure of the layered oxide cathode material provided by the present disclosure, the coverage rate of each coating layer may reach 80% or more, namely a good, complete and uniform coating structure is achieved, and thus the air stability of the layered oxide cathode material obtained is further improved.

A second aspect of the present disclosure provides a preparation method for the above layered oxide cathode material, and the preparation method includes: an O3-phase nickel-manganese-based oxide layered particle and a first metal source are prepared, the O3-phase nickel-manganese-based oxide layered particle is mixed with the first metal source, and first ball-milling is performed, to obtain a first pre-coated particle; first calcination treatment is performed on the first pre-coated particle, to obtain an O3@P2-phase composite oxide particle; the O3@P2-phase composite oxide particle is mixed with a carbon source and/or a second metal source, and second ball-milling is performed, to obtain a second pre-coated particle; and optional second calcination treatment is performed on the second pre-coated particle, to obtain the layered oxide cathode material.

In technical schemes of embodiments of the present disclosure, pre-coating the O3-phase nickel manganese-based oxide layer-like particles with a first metal source to improve the bonding strength between the two, and then, by an in-situ solid-phase reaction, the P2-phase metal oxide coating layer is generated in situ on the surface of the O3-phase nickel-manganese-based oxide layered particle, thereby the residual alkali on its surface is significantly consumed, and the air stability is improved. Afterwards, the O3@P2-phase composite oxide particle is pre-coated by ball-milling with the carbon source and/or the second metal source, and the inert coating layer is generated by an in-situ solid-phase reaction again. Compared with simple mixed coating or liquid-phase reactions, a layered oxide cathode material provided by the above in-situ solid-phase reaction may better coordinate the physicochemical performance between the coating layers, protect the structural integrity of the core particles and the coating layers, simplify the process, and obtain the layered oxide cathode material with better performance and higher added value. Meanwhile, the preparation method for the layered oxide cathode material provided by the present disclosure is simple, highly compatible with existing preparation processes, and easy to large-scale industrial applications.

Further, the rotation speed of the first ball-milling is 100 rpm-500 rpm, and the time is 0.5 h-4 h; and/or, the rotation speed of the second ball-milling is 100 rpm-500 rpm, and the time is 0.5 h-4 h.

In this embodiment, by setting the experimental conditions for two times of ball-milling according to the above ways, more uniform coating may be achieved, thereby the composition uniformity, structural continuity, and coating integrity of the obtained P2-phase metal oxide coating layer and inert coating layer are improved.

Further, the weight ratio of the O3-phase nickel-manganese-based oxide layered particle to the first metal source is 1:(0.005-0.05), and the weight ratio of the O3@P2-phase composite oxide particle to the carbon source and/or the second metal source is 1:(0.005-0.05); preferably, the first metal source includes a sodium source and a coating metal source, the coating metal source is selected from one or more of oxide, hydroxide, carbonate, sulfate, oxalate, acetate, and citrate corresponding to Fe, Ti, Mg, Cu, Al, Ca and Co, and the sodium source is selected from one or more of sodium carbonate, sodium hydroxide, sodium nitrate, and sodium peroxide; and preferably, the carbon source is selected from one or more of coal tar, coal pitch, petroleum pitch, expanded graphite, carbon black, and graphene, and the second metal source is selected from one or more of oxide, hydroxide, and carbonate corresponding to Ni, Mn, Fe, Ti, Mg, Cu, Al, Ca, and Co.

In this embodiment, the inventors preferably select the above weight ratio relationship by extensive experiments, and corresponding to the weight ratio and coating thickness of the P2-phase metal oxide coating layer and the inert coating layer, it is discovered that the preparation of the layered oxide cathode material under the above weight ratio relationship may more effectively improve the electrochemical performance and air stability of the layered oxide cathode material obtained. The inventors preferably select a plurality of the above coating metal sources and sodium sources by extensive comparative experiments, and it is discovered that when the above types are selected, the solid-phase reaction may be performed more smoothly, thereby the formation of the P2-phase metal oxide coating layer may be achieved, and the preparation of the cathode material with the expected structure is promoted. Similarly, the inventors preferably select a plurality of the above carbon sources and second metal sources by extensive comparative experiments, and it is discovered that when the above types are selected, the inert coating layer may be formed smoothly in a more continuous, uniform, and dense state, thereby the layered oxide cathode material with high-performance is obtained.

Further, a temperature of the first calcination treatment is 600° C.-1000° C., and the first calcination treatment time is 2 h-20 h; a temperature of the second calcination treatment is 400° C.-1000° C., and the second calcination treatment time is 0.5 h-20 h; and preferably, the calcination atmosphere of the first calcination treatment is an air and/or oxygen atmosphere.

In this embodiment, the inventors preferably select the temperature conditions and the time conditions for the above two times of the calcinations respectively by extensive experiments, and it is discovered that when it is performed according to these conditions, the two coating layers obtained are more stable in structure, namely the combination of the P2-phase metal oxide coating layer and the surface of the O3-phase nickel-manganese-based oxide layered particle, and the combination of the inert coating layer and the surface of the O3@P2-phase composite oxide particle are tighter, thereby the layered oxide cathode material prepared has the better air stability.

More preferably, the calcination atmosphere of the first calcination treatment is the air and/or oxygen atmosphere, and the inventors prefer the first calcination to be performed under the condition of air presence, thereby the P2-phase oxide coating layer is more efficiently formed, and the ion conductivity is improved.

Further, when the O3@P2-phase composite oxide particle is mixed with the second metal source, the second calcination treatment is performed, the temperature of the second calcination treatment is 700° C.-1000° C., the second calcination treatment time is 10 h-20 h, and the second calcination treatment atmosphere is the air and/or oxygen atmosphere. At this time, the inert coating layer is an inorganic metal oxide layer, and the inventors preferably select the above conditions by extensive experiments, as to form the inert coating layer with the more stable and dense structure, thereby the air stability of the layered oxide cathode material formed finally is improved.

In this embodiment, when the O3@P2-phase composite oxide particle is mixed with the carbon source, and the carbon source is selected from one or more of coal tar, coal pitch, and petroleum pitch, the second calcination treatment is performed, the temperature of the second calcination treatment is 400° C.-800° C., the second calcination treatment time is 0.5 h-2 h, and the second calcination treatment atmosphere is a nitrogen atmosphere and/or an argon atmosphere. At this time, the inert coating layer is a carbon layer, and the carbon source contains various small-molecular organic matters. Therefore, the inventors preferably select the above conditions by extensive experiments, as to achieve the removal of organic small molecules in the coal tar, coal pitch, and petroleum pitch, while carbonization is completed, to obtain a more complete stable carbon layer, thereby the air stability of the layered oxide cathode material formed finally is improved.

When the O3@P2-phase composite oxide particle is mixed with the carbon source, and the carbon source is selected from one or more of expanded graphite, carbon black, and graphene, the second calcination treatment is not performed, and the layered oxide cathode material is obtained after the second ball-milling. At this time, the inert coating layer is a carbon layer, and the carbon source only contains elemental carbon. Therefore, in order to simplify the process and shorten the cycle, the layered oxide cathode material is directly obtained after the second ball-milling.

A third aspect of the present disclosure provides a cathode sheet, and the cathode sheet includes the above layered oxide cathode material.

In this embodiment, the cathode sheet contains the above layered oxide cathode material, thus it has high electrochemical performance and good air stability.

A fourth aspect of the present disclosure provides a sodium ion battery, and the sodium ion battery includes the above cathode sheet.

Since the above cathode material obtained in the present disclosure has both excellent electrochemical performance and structural stability, when it is applied as a component of the cathode sheet in the sodium ion battery, the sodium ion battery obtained also has comprehensively improved electrochemical performance, including improved initial coulombic efficiency, excellent rate performance, long cycle life, and good air stability, thereby it may be well applied in a plurality of usage scenes.

The above description is only an overview of the technical schemes of the present disclosure. In order to understand the technical means of the present disclosure more clearly, it may be implemented according to the content of the description, and in order to make the above and other purposes, features, and advantages of the present disclosure more apparent and easier to understand, specific implementation modes of the present disclosure are listed below.

BRIEF DESCRIPTION OF THE DRAWINGS

In order to describe technical schemes of the present disclosure more clearly, drawings used in the present disclosure are briefly introduced below. Apparently, the drawings described below are only some implementation modes of the present disclosure. For those of ordinary skill in the art, other drawings may also be obtained according to these drawings without paying creative labor.

DETAILED DESCRIPTION OF THE EMBODIMENTS

Figure 1:
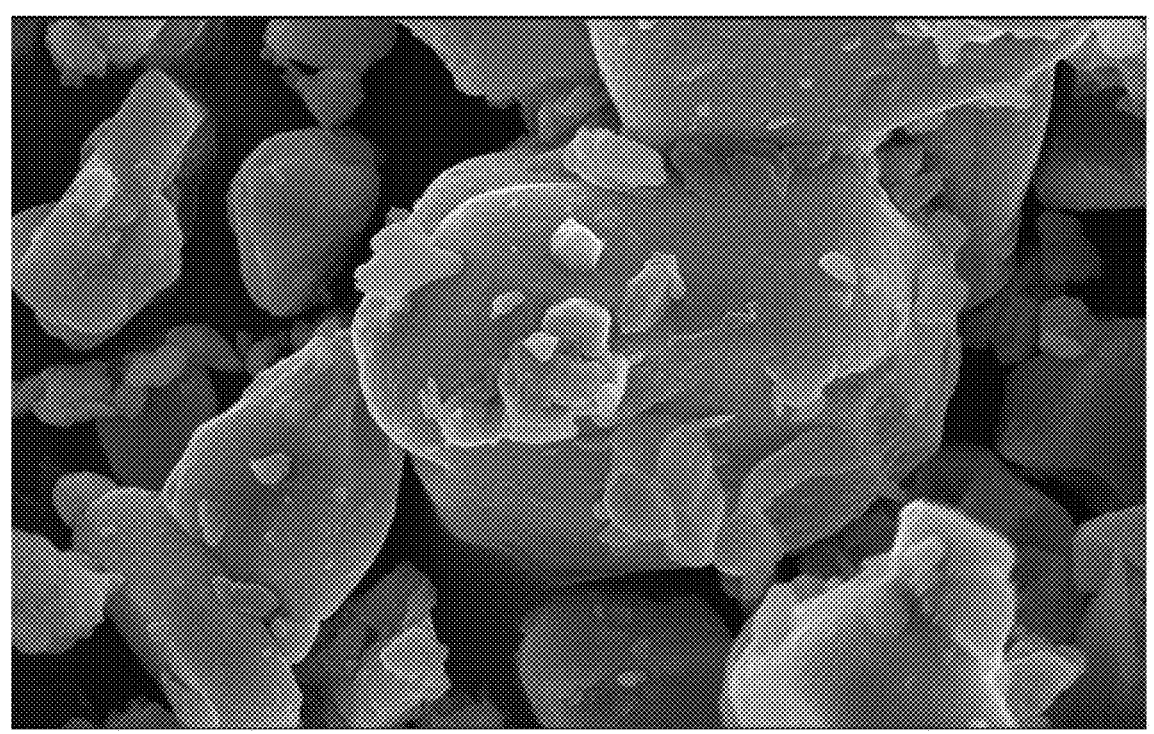
FIG. 1 is a scanning electron microscope image of a layered oxide cathode material obtained in Embodiment 1.

Embodiments of technical schemes of the present disclosure are described in detail below in combination with the drawings. The following embodiments are only intended to describe the technical schemes of the present disclosure more clearly, and therefore are only used as embodiments and may not be used to limit the scope of protection of the present disclosure.

Unless otherwise defined, all technical and scientific terms used in this article have the same meanings as those commonly understood by those skilled in the art of the present disclosure; the terms used in this article are only for the purpose of describing the specific embodiments and are not intended to limit the present disclosure; and the terms "including" and "having" in the description and claims of the present disclosure, as well as the above drawings, and any variations thereof, are intended to cover non-exclusive inclusion.

In the description of the embodiments of the present disclosure, the technical terms such as "first" and "second" are only used to distinguish different objects and may not be understood as indicating or implying relative importance or implicitly indicating the number, specific order, or primary and secondary relationship of the indicated technical features. In the description of the embodiments of the present disclosure, "multiple" means two or more, unless otherwise expressly specified.

"Embodiments" referred in this article means that specific features, structures, or characters described in combination with the embodiments may be contained in at least one embodiment of the present disclosure. The phrase appearing in various positions in the description does not necessarily refer to the same embodiment, or an independent or alternative embodiment that is mutually exclusive with other embodiments. Those skilled in the art explicitly and implicitly understand that the embodiments described in this article may be combined with other embodiments.

In the description of the embodiments of the present disclosure, the term "and/or" is only a description of an association relationship of associated objects, it is indicated that there may be three relationships, such as A and/or B, which may represent: the presence of A alone, the presence of A and B simultaneously, and the presence of B alone. In addition, the character "/" in this article generally represents that the front and rear associated objects are an "or" relationship.

In the description of the embodiments of the present disclosure, the term "multiple" refers to two or more (including two), similarly, "multiple groups" refers to two groups or more (including two groups), and "multiple pieces" refers to two pieces or more (including two pieces).

In the description of the embodiments of the present disclosure, the orientation or position relationship indicated by the technical terms "center", "longitudinal", "transverse", "length", "width", "thickness", "up", "down", "front", "back", "left", "right", "vertical", "horizontal", "top", "bottom", "inside", "outside", "clockwise", "counterclockwise", "axial", "radial", "circumferential", and the like is an orientation or position relationship based on the drawings, and is only for the convenience of describing the embodiments of the present disclosure and simplifying the description, and does not indicate or imply that the apparatus or element indicated must have a specific orientation, be constructed and operated in a specific orientation. Therefore, it may not be understood as limiting the embodiments of present disclosure.

In the description of the embodiments of the present disclosure, unless otherwise expressly specified and limited, the technical terms such as "installation", "linkage", "connection", and "fixation" should be broadly understood, for example, it may be a fixed connection, a detachable connection, or integrated; it may also be a mechanical connection or an electrical connection; and it may be directly connected or indirectly connected by an intermediate medium, and may be an internal communication of two elements or an interaction relationship between two elements. For those of ordinary skill in the art, the specific meanings of the above terms in the embodiments of the present disclosure may be understood according to specific circumstances.

As described in the background, there is a problem of poor electrochemical performance of sodium ion batteries due to residual alkali and poor air stability of sodium ion battery cathode materials in existing technologies. In order to solve the above technical problem, a first aspect of the present disclosure provides a layered oxide cathode material, the layered oxide cathode material includes an O3@P2-phase composite oxide particle and an inert coating layer coated on the surface of the O3@P2-phase composite oxide particle, and the O3@P2-phase composite oxide particle includes an O3-phase nickel-manganese-based oxide layered particle and a P2-phase metal oxide coating layer coated on the surface of the O3-phase nickel-manganese-based oxide layered particles; and the inert coating layer is a carbon layer and/or an inorganic metal oxide layer.

The layered oxide cathode material provided by the present disclosure includes an O3-phase nickel-manganese-based oxide layered particle core, a first P2-phase metal oxide coating layer coated on it, and a second inert coating layer, herein the first P2-phase metal oxide coating layer reduces the residual alkali content on the surface of the O3-phase nickel-manganese-based oxide layered particle and provides a good sodium ion transport channel, and the inert coating layer delays a side reaction between the outer surface of the layered oxide cathode material and the air and electrolyte, thereby the layered oxide cathode material shows high electrochemical performance and good air stability overall.

Specifically, the P2-phase metal oxide coating layer coordinates with the inert coating layer mutually, to synergistically improve the comprehensive electrochemical performance of the O3-phase nickel-manganese-based oxide layered particle, herein: the inert coating layer is good in stability, uniform, and dense, and when it is coated on the outermost surface and directly in contact with the electrolyte, it may more effectively reduce the side reactions between the layered oxide cathode material prepared and the electrolyte, thereby the erosion of hydrogen fluoride (HF) generated by the side reactions on cathode effective components is reduced, and its service life is prolonged. At the same time, the inert coating layer with certain flexibility may also effectively suppress the generation of internal cracks in particles of the layered oxide cathode material. However, if the inert coating layer directly contacts with the O3-phase nickel-manganese-based oxide layered particle, it may block the diffusion channels of metal ions in its core, thus the electrochemical performance of a cathode material is affected. In view of this, the present disclosure adopts a mode of sequentially coating the P2-phase metal oxide coating layer and the inert coating layer, herein although the P2-phase metal oxide coating layer has poorer side reaction suppression ability, it has higher ion conductivity and may effectively reduce the charge transfer impedance on the surface of the O3-phase nickel-manganese-based oxide layered particle.

The inventors comprehensively consider the above situation and verifies by a large number of experiments that the P2-phase metal oxide coating layer is used in combination with the inert coating layer, namely the P2-phase metal oxide coating layer that has the good ion conductivity and may significantly consume the residual alkali coated on the surface of the O3-phase nickel-manganese-based oxide layered particles, afterwards, the inert coating layer is coated on the surface of the P2-phase metal oxide coating layer, and the inert coating layer directly contacts with the electrolyte. The present disclosure combines the advantages of two types of the coating layers, as to improve the electrochemical performance of the layered oxide cathode material obtained finally, thereby the initial coulombic efficiency, rate performance, and cycle life of the sodium ion battery prepared by using this cathode material may be improved.

Further, a molecular formula of the O3-phase nickel-manganese-based oxide layered particle is $Na_xNi_aMn_bM1_cO_2$, herein $0.8 \leq x \geq 1.0$, a+b+c=1.0, a, b, and c are all positive numbers, and M1 is selected from one or more of Fe, Ti, Mg, Cu, Al, Ca, Zn, and Co. The inventors select and optimize the types of the O3-phase nickel-manganese-based oxide layered particle by extensive experiments, and it is discovered that when its components are based on the element composition in the above molecular formula and the stoichiometric ratio, the electrochemical performance is more excellent. On this basis, further preferably, the M1 is selected from one or more of Fe, Ti, Mg, Cu, Zn, and Ca. When the above metal elements are used, the electrochemical performance of the O3-phase nickel-manganese-based oxide layered particle is further improved, and it may also be better compatible and coordinated with the coating layer on it.

In a plurality of typical implementation modes, a molecular formula of the P2-phase metal oxide coating layer is $Na_yM2O_2$, herein $0.6 \leq y \leq 0.8$, and M2 is selected from one or more of Ni, Mn, Fe, Ti, Mg, Cu, Al, Ca, and Co. The inventors select and optimize the types of the P2-phase metal oxide coating layer by extensive experiments, and it is discovered that when its components are based on the element composition in the above molecular formula and the stoichiometric ratio, it may better reduce the residual alkali content on the surface of the O3-phase nickel-manganese-based oxide layered particle and effectively improve its ion conductivity. On this basis, the invention further preferably selects the M2 from one or more of Fe, Mn, Mg, Cu, Zn, and Ca by extensive experiments. When the above metal elements are used, the P2-phase metal oxide coating layer obtained may more effectively reduce the charge transfer impedance on the surface of the O3-phase nickel-manganese-based oxide layered particle, thereby the electrochemical performance of the layered oxide cathode material obtained is more significantly improved.

In terms of the selection of the inert coating layer other than the carbon layer, the inventors conduct extensive experiments. In a plurality of preferred embodiments, the inorganic metal oxide layer is preferably one or more of $Al_2O_3$ layer, $TiO_2$ layer, CuO layer, and MgO layer. Compared to the inorganic metal oxide layers formed by other metals, the structures of the above inorganic metal oxide layers are more stable and may better suppress side reactions between the O3@P2-phase composite oxide particle and electrolyte. On this basis, the inventors further select the inorganic metal oxide layer preferably from one or more of the $Al_2O_3$ layer, $TiO_2$ layer, and MgO layer, and it is discovered that these inorganic metal oxide layers may better coordinate with the P2-phase metal oxide coating layer preferably selected above, while the cost is also low, and the added value of the cathode material prepared may be effectively improved.

In a plurality of typical implementation modes, the M1 in the O3-phase nickel-manganese-based oxide layered particle is Ti, and the M2 in the P2-phase metal oxide coating layer is selected from one or more of Fe, Cu, and Mn; alternatively, the M1 in the O3-phase nickel-manganese-based oxide layered particle is Cu or Ti and Cu, and the M2 in the P2-phase metal oxide coating layer is selected from one or more of Mg, Cu and Mn. Since the P2-phase metal oxide coating layer plays a role in connecting the O3-phase nickel-manganese-based oxide layered particles and the inert coating layer, whether it may achieve good combination with the O3-phase nickel-manganese-based oxide layered particles is a very important factor. The inventors, by extensive experiments and comparisons, discover that when the M2 in the P2-phase metal oxide coating layer and the M1 in the O3-phase nickel-manganese-based oxide layered particle are combined in the above way, the P2-phase metal oxide coating layer may better combine with the O3-phase nickel-manganese-based oxide layered particle. At the same time, the residual alkali on the surface of the O3-phase nickel-manganese-based oxide may be more effectively eliminated, thereby the electrochemical performance of the layered oxide cathode material obtained finally is improved, and the initial coulombic efficiency, rate performance, and cycle life of the sodium ion battery prepared by using this cathode material are improved.

The inventors perform extensive experiments and further preferably select the core oxide and two coating layers of the layered oxide cathode material. In two most typical implementation modes, it is discovered that: the molecular formula of the O3-phase nickel-manganese-based oxide layered particle is $NaNi_{0.5}Mn_{0.4}Ti_{0.1}O_2$, the molecular formula of the P2-phase metal oxide coating layer is $Na_{9/7}Cu_{2/9}Fe_{1/9}Mn_{2/3}O_2$, and the inert coating layer is the $Al_2O_3$ layer;

alternatively, the molecular formula of the O3-phase nickel-manganese-based oxide layered particle is $NaNi_{0.45}Mn_{0.4}Ti_{0.1}Cu_{0.05}O_2$, the molecular formula of the P2-phase metal oxide coating layer is $Na_{0.6}Mg_{0.15}Cu_{0.15}Mn_{0.7}O_2$, and the inert coating layer is the carbon layer. When the O3-phase nickel-manganese-based oxide layered particle as the core, the P2-phase metal oxide coating layer as the first coating layer, and the inert coating layer as the second coating layer in the layered oxide cathode material are set according to the above two ways, the layered oxide cathode material obtained not only has excellent electrochemical performance and higher air stability, but also may better meet its practical application needs.

In addition to the above element coordination schemes selected preferably, during the experiments, the inventors also discover that layer thickness, mass ratio, and degree of coating also have significant impacts on each performance of the layered oxide cathode material obtained. In a typical implementation mode, in the layered oxide cathode material, the thickness of the P2-phase metal oxide coating layer is 2 nm-100 nm, and the thickness of the inert coating layer is 2 nm-100 nm. When the thicknesses of the P2-phase metal oxide coating layer and the inert coating layer are within the above ranges, it may better balance between suppressing the side reactions, consuming the residual alkali, and improving the conductivity, thereby the electrochemical performance of the layered oxide cathode material obtained is improved better. In terms of the mass ratios of the P2-phase metal oxide coating layer and the inert coating layer, in a preferred embodiment, calculated by using the weight of the layered oxide cathode material as 100%, a mass fraction of the P2-phase metal oxide coating layer is 0.5%-5%, and a mass fraction of the inert coating layer is 0.5%-5%. When the two coating layers are set respectively according to the above weight ratios, better coordination and mass transfer may be achieved between the P2-phase metal oxide coating layer and the inert coating layer, as well as between the P2-phase metal oxide coating layer and the core particles, and the electrochemical performance of the layered oxide cathode material obtained is also higher. In addition, in a plurality of typical implementation modes, a coverage rate of the P2-phase metal oxide coating layer on the surface of the O3-phase nickel-manganese-based oxide layered particle is 80%-100%; and a coverage rate of the inert coating layer on the surface of the O3@P2-phase composite oxide particle is 80%-100%. In the structure of the layered oxide cathode material provided by the present disclosure, the coverage rate of the P2-phase metal oxide coating layer and the inert coating layer may reach 80% or more, namely a good, complete and uniform coating structure is achieved, and thus the air stability of the layered oxide cathode material is further improved.

A second aspect of the present disclosure provides a preparation method for the above layered oxide cathode material, and the preparation method includes: an O3-phase nickel-manganese-based oxide layered particle and a first metal source are prepared, the O3-phase nickel-manganese-based oxide layered particle is mixed with the first metal source, and first ball-milling is performed, to obtain a first pre-coated particle; first calcination treatment is performed on the first pre-coated particle, to obtain an O3@P2-phase composite oxide particle; the O3@P2-phase composite oxide particle is mixed with a carbon source and/or a second metal source, and second ball-milling is performed, to obtain a second pre-coated particle; and optional second calcination treatment is performed on the second pre-coated particle, to obtain the layered oxide cathode material.

The above preparation method provided by the present disclosure is simple, involves readily available devices and process conditions, and may be well compatible with various preparation methods for existing cathode materials. Specifically, pre-coating the O3-phase nickel manganese-based oxide layer-like particles with a first metal source to improve the bonding strength between the two, and then, by an in-situ solid-phase reaction, the P2-phase metal oxide coating layer is generated in situ on the surface of the O3-phase nickel-manganese-based oxide layered particle, thereby the residual alkali on its surface is significantly consumed, and the air stability is improved. Afterwards, the O3@P2-phase composite oxide particle is pre-coated by ball-milling with the carbon source and/or the second metal source, and the inert coating layer is generated by an in-situ solid-phase reaction again. Compared with simple mixed coating or liquid-phase reactions, a layered oxide cathode material provided by the above in-situ solid-phase reaction may better coordinate the physicochemical performance between the coating layers, protect the structural integrity of the core particles and the coating layers, simplify the process, and obtain the layered oxide cathode material with better performance and higher product added value.

In order to improve the effect of two times of pre-coating, preferably, the rotation speed of the first ball-milling is 100 rpm-500 rpm, and the time is 0.5 h-4 h; and/or, the rotation speed of the second ball-milling is 100 rpm-500 rpm, and the time is 0.5 h-4 h. By setting the experimental conditions for two times of the ball-milling according to the above ways, more uniform coating may be achieved, thereby the composition uniformity, structural continuity, and coating integrity of the obtained P2-phase metal oxide coating layer and inert coating layer are improved.

In order to better regulate the weight ratio and the coating thickness of the P2-phase metal oxide coating layer and the inert coating layer, the inventors preferably select in a plurality of typical implementation modes that the weight ratio of the O3-phase nickel-manganese-based oxide layered particle to the first metal source is 1:(0.005-0.05), and the weight ratio of the O3@P2-phase composite oxide particle to the carbon source and/or the second metal source is 1:(0.005-0.05). The inventors preferably select the above weight ratio relationship by extensive experiments, and corresponding to the weight ratio and coating thickness of the P2-phase metal oxide coating layer and the inert coating layer, it is discovered that prepared under the above weight ratio relationship, the electrochemical performance and air stability of the layered oxide cathode material may be more effectively improved.

In a plurality of preferred embodiments, the first metal source includes a sodium source and a coating metal source, the coating metal source is selected from one or more of oxide, hydroxide, carbonate, sulfate, oxalate, acetate, and citrate corresponding to Fe, Ti, Mg, Cu, Al, Ca, Zn, and Co, and the sodium source is selected from one or more of sodium carbonate, sodium hydroxide, sodium nitrate, and sodium peroxide. The inventors preferably select a plurality of the above coating metal sources and sodium sources by extensive comparative experiments, and it is discovered that when the above types are selected, the solid-phase reaction may be performed more smoothly, thereby the formation of the P2-phase metal oxide coating layer may be achieved, and the preparation of the layered oxide cathode material with the expected structure is promoted.

In a plurality of preferred embodiments, the carbon source is selected from one or more of coal tar, coal pitch, petroleum pitch, expanded graphite, carbon black, and graphene, and the second metal source is selected from one or more of oxide, hydroxide, and carbonate corresponding to Ni, Mn, Fe, Ti, Mg, Cu, Al, Ca, and Co. Similarly, the inventors preferably select a plurality of the above carbon sources and second metal sources by extensive comparative experiments, and it is discovered that when the above types are selected, the inert coating layer may be formed smoothly in a more continuous, uniform, and dense state, thereby the high-performance layered oxide cathode material is obtained.

The present disclosure achieves the formation of the P2-phase metal oxide coating layer and the inert coating layer by the calcination and the solid-phase reaction. In a typical implementation mode, a temperature of the first calcination treatment is 600° C.-1000° C., and the first calcination treatment time is 2 h-20 h; a temperature of the second calcination treatment is 400° C.-1000° C., and the second calcination treatment time is 0.5 h-20 h. The inventors preferably select the temperature conditions and the time conditions for the above two times of the calcinations respectively by extensive experiments, and it is discovered that when it is performed according to these conditions, the two coating layers obtained are more stable in structure, namely the combination of the P2-phase metal oxide coating layer and the surface of the O3-phase nickel-manganese-based oxide layered particle, and the combination of the inert coating layer and the surface of the O3@P2-phase composite oxide particle are tighter, thereby the layered oxide cathode material prepared has the better air stability.

More preferably, the calcination atmosphere of the first calcination treatment is an air and/or oxygen atmosphere. The inventors prefer the first calcination to be performed under the condition of air presence, thereby the P2-phase oxide coating layer is more efficiently formed, and the ion conductivity is improved.

In a plurality of typical implementation modes:

when the O3@P2-phase composite oxide particle is mixed with the second metal source, the second calcination treatment is performed, the temperature of the second calcination treatment is 700° C.-1000° C., the second calcination treatment time is 10 h-20 h, and the second calcination treatment atmosphere is the air and/or oxygen atmosphere. At this time, the inert coating layer is an inorganic metal oxide layer, and the inventors preferably select the above conditions by extensive experiments, as to form the inert coating layer with the more stable and dense structure, thereby the air stability of the layered oxide cathode material formed finally is improved.

When the O3@P2-phase composite oxide particle is mixed with the carbon source, and the carbon source is selected from one or more of coal tar, coal pitch, and petroleum pitch, the second calcination treatment is performed, the temperature of the second calcination treatment is 400° C.-800° C., the second calcination treatment time is 0.5 h-2 h, and the second calcination treatment atmosphere is a nitrogen atmosphere and/or an argon atmosphere. At this time, the inert coating layer is a carbon layer, and the carbon source contains various small-molecular organic matters. Therefore, the inventors preferably select the above conditions by extensive experiments, as to achieve the removal of organic small molecules in the coal tar, coal pitch, and petroleum pitch, while carbonization is completed, to obtain a more complete stable carbon layer, thereby the air stability of the layered oxide cathode material formed finally is improved.

When the O3@P2-phase composite oxide particle is mixed with the carbon source, and the carbon source is selected from one or more of expanded graphite, carbon black, and graphene, the second calcination treatment is not performed, and the layered oxide cathode material is obtained after the second ball-milling. At this time, the inert coating layer is a carbon layer, and the carbon source only contains elemental carbon. Therefore, in order to simplify the process and shorten the cycle, the layered oxide cathode material is directly obtained after the second ball-milling, and the carbon layer in its structure achieves complete and stable coating.

A third aspect of the present disclosure provides a cathode sheet, and the cathode sheet includes the above layered oxide cathode material.

A fourth aspect of the present disclosure provides a sodium ion battery, and the sodium ion battery includes the above cathode sheet.

Since the above cathode material obtained in the present disclosure has both excellent electrochemical performance and structural stability, when it is applied as a component of the cathode sheet in the sodium ion battery, the sodium ion battery obtained also has comprehensively improved electrochemical performance, including improved initial coulombic efficiency, excellent rate performance, long cycle life, and good air stability, thereby it may be well applied in a plurality of usage scenes.

The present disclosure is further described in detail below in combination with specific embodiments, and these embodiments may not be understood as limiting the scope of protection claimed by the present disclosure.

Unless otherwise defined, all professional terms used in the following text have the same meanings as those commonly understood by those skilled in the art. The professional terms used in this article are only for the purpose of describing the specific embodiments and are not intended to limit the scope of protection of the present disclosure.

Some specific embodiments are listed below. It should be noted that the embodiments described below are exemplary and are only intended to explain the present disclosure, and may not be understood as limitations to the present disclosure. If specific technologies or conditions are not specified in the embodiments, it is implemented according to technologies or conditions described in documents in this field or according to product instructions. Reagents or instruments used without specifying manufacturers are conventional products that may be obtained by market purchase.

I. Preparation Method

Embodiment 1

Preparation method for layered oxide cathode material:

firstly, an O3-phase cathode material $NaNi_{0.45}Mn_{0.4}Ti_{0.1}Cu_{0.05}O_2$ was prepared: according to the molecular formula stoichiometric ratio, sodium carbonate, nickel oxide, manganese dioxide, titanium dioxide, and copper oxide were weighed, and mixed uniformly with a certain amount of anhydrous ethanol in a ball-milling machine, herein the mixing time was 3 h, and the ball-mill rotation speed was 450 r/min. It was dried in a vacuum drying oven for 12 h, to obtain dry powder; and the powder was placed in an air atmosphere for high-temperature calcination, herein the calcination temperature was 900° C., and the temperature holding time was 15 h.

Secondly, according to the stoichiometric ratio in the P2-phase molecular formula, sodium carbonate, magnesium oxide, copper oxide, and manganese dioxide were weighed, and ground fully to obtain a first metal source, 1 g of the first metal source and 20 g of the O3-phase cathode material $NaNi_{0.45}Mn_{0.4}Ti_{0.1}Cu_{0.05}O_2$ were placed in a ball-milling jar, to obtain a first pre-coated particle, herein the ball-milling time was 3 h, and the rotation speed was 450 rmp; the first pre-coated particle sample after ball-milling was placed in a muffle furnace, calcined at 900° C. for 10 h, cooled and ground, to obtain an O3@P2-Phase composite oxide particle with a P2-phase metal oxide coating layer, herein the P2-phase molecular formula was $Na_{0.6}Mg_{0.15}Cu_{0.15}Mn_{0.7}O_2$.

Figure 3:
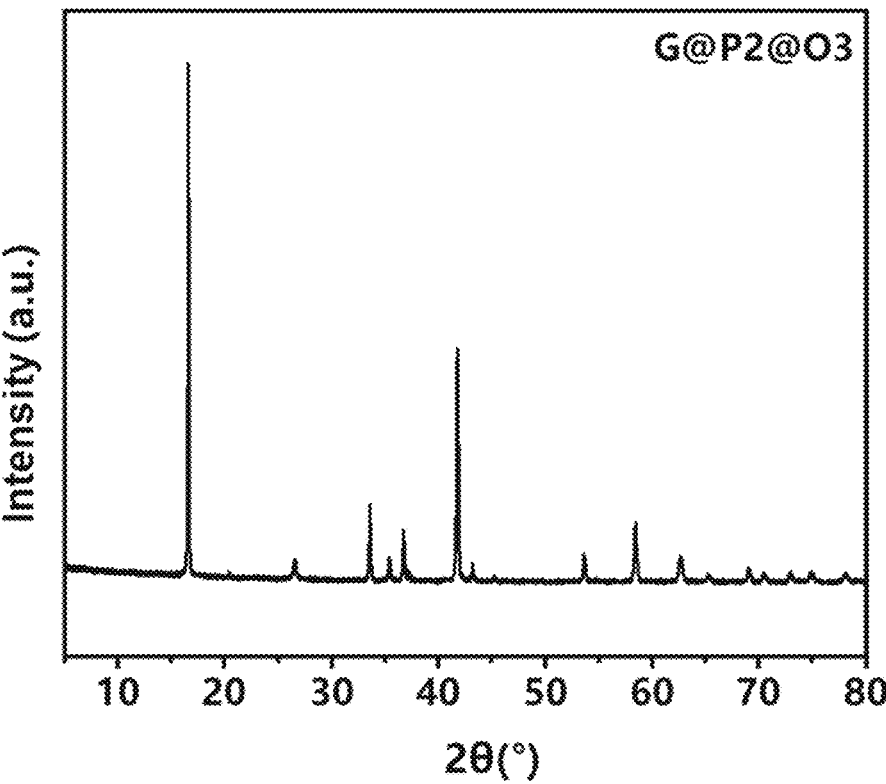
FIG. 3 is an X-ray diffraction (XRD) image of the layered oxide cathode material obtained in Embodiment 1.

Finally, 10 g of the O3@P2-Phase composite oxide particle with the first coating layer and 0.2 g of expanded graphite were placed in the ball-milling jar, to obtain a second pre-coated particle, herein the ball-milling time was 3 h, and the rotation speed was 450 rpm; the second pre-coated particle sample after ball-milling was full dried and ground, to obtain a layered oxide cathode material with a P2-phase metal oxide coating layer and an inert coating layer, which was marked as G@P2@O3, herein a scanning electron microscope image of the G@P2@O3 layered oxide cathode material obtained was shown in FIG. 1, and an XRD test spectrum was shown in FIG. 3.

In the G@P2@O3 layered oxide cathode material, the thickness of the P2-phase metal oxide coating layer was 12 nm, and the thickness of the inert coating layer was 20 nm.

Embodiment 2

Preparation method for layered oxide cathode material:

firstly, an O3-phase cathode material $NaNi_{0.5}Mn_{0.4}Ti_{0.1}O_2$ was prepared: according to the molecular formula stoichiometric ratio, sodium carbonate, nickel oxide, manganese dioxide, and titanium dioxide were weighed, and mixed uniformly with a certain amount of anhydrous ethanol in a ball-milling machine, herein the mixing time was 3 h, and the ball-mill rotation speed was 450 r/min. It was dried in a vacuum drying oven for 12 h, to obtain dry powder; and the powder was placed in an air atmosphere for high-temperature calcination, herein the calcination temperature was 900° C., and the temperature holding time was 15 h.

Secondly, according to the stoichiometric ratio in the P2-phase molecular formula, sodium carbonate, magnesium oxide, copper oxide, and manganese dioxide were weighed, and ground fully to obtain a first metal source, 1 g of the first metal source and 20 g of the O3-phase cathode material $NaNi_{0.5}Mn_{0.4}Ti_{0.1}O_2$ were placed in a ball-milling jar, to obtain a first pre-coated particle, herein the ball-milling time was 3 h, and the rotation speed was 450 rmp; the first pre-coated particle sample after ball-milling was placed in a muffle furnace, calcined at 900° C. for 10 h, cooled and ground, to obtain an O3@P2-Phase composite oxide particle with a P2-phase metal oxide coating layer, herein the P2-phase molecular formula was $Na_{9}/7Cu_{2/9}Fe_{1/9}Mn_{2/3}O_2$.

Finally, 10 g of the O3@P2-Phase composite oxide particle with the first coating layer and 0.05 g of $Al_2O_3$ were placed in the ball-milling jar, to obtain a second pre-coated particle, herein the ball-milling time was 3 h, and the rotation speed was 450 rpm; and the second pre-coated particle sample after ball-milling was placed in the muffle furnace, calcined at 600° C. for 10 h, fully dried and ground, to obtain a layered oxide cathode material with the P2-phase metal oxide coating layer and an inert coating layer, which was marked as a $Al_2O_3$@P2@O3 layered oxide cathode material.

In the $Al_2O_3$@P2@O3 layered oxide cathode material, the thickness of the P2-phase metal oxide coating layer was 14 nm, and the thickness of the inert coating layer was 18 nm.

Embodiment 3

Preparation method for layered oxide cathode material:

firstly, an O3-phase cathode material $NaNi_{0.45}Mn_{0.4}Ti_{0.1}Fe_{0.05}O_2$ was prepared: according to the molecular formula stoichiometric ratio, sodium carbonate, nickel oxide, manganese dioxide, titanium dioxide, and ferric oxide were weighed, and mixed uniformly with a certain amount of anhydrous ethanol in a ball-milling machine, herein the mixing time was 3 h, and the ball-mill rotation speed was 450 r/min. It was dried in a vacuum drying oven for 12 h, to obtain dry powder; and the powder was placed in an air atmosphere for high-temperature calcination, herein the calcination temperature was 900° C., and the temperature holding time was 15 h.

Secondly, according to the stoichiometric ratio in the P2-phase molecular formula, sodium carbonate, magnesium oxide, copper oxide, and manganese dioxide were weighed, and ground fully to obtain a first metal source, 1 g of the first metal source and 20 g of the O3-phase cathode material $NaNi_{0.45}Mn_{0.4}Ti_{0.1}Fe_{0.05}O_2$ were placed in a ball-milling jar, to obtain a first pre-coated particle, herein the ball-milling time was 3 h, and the rotation speed was 450 rmp; the first pre-coated particle sample after ball-milling was placed in a muffle furnace, calcined at 900° C. for 10 h, cooled and ground, to obtain an O3@P2-Phase composite oxide particle with a P2-phase metal oxide coating layer, herein the P2-phase molecular formula was $Na_{0.6}Mg_{0.15}Cu_{0.15}Mn_{0.7}O_2$.

Finally, 10 g of the O3@P2-Phase composite oxide particle with the first coating layer and 0.05 g of $Al_2O_3$ were placed in the ball-milling jar, to obtain a second pre-coated particle, herein the ball-milling time was 3 h, and the rotation speed was 450 rpm; and the second pre-coated particle sample after ball-milling was placed in the muffle furnace, calcined at 600° C. for 10 h, fully dried and ground, to obtain a layered oxide cathode material with the P2-phase metal oxide coating layer and an inert coating layer, which was marked as a $Al_2O_3$@P2@O3 layered oxide cathode material.

In the $Al_2O_3$@P2@O3 layered oxide cathode material, the thickness of the P2-phase metal oxide coating layer was 15 nm, and the thickness of the inert coating layer was 22 nm.

Embodiment 4

Preparation method for layered oxide cathode material:

firstly, an O3-phase cathode material $NaNi_{0.45}Mn_{0.4}Ti_{0.1}Zn_{0.05}O_2$ was prepared: according to the molecular formula stoichiometric ratio, sodium carbonate, nickel oxide, manganese dioxide, titanium dioxide, and zinc oxide were weighed, and mixed uniformly with a certain amount of anhydrous ethanol in a ball-milling machine, herein the mixing time was 3 h, and the ball-mill rotation speed was 450 r/min. It was dried in a vacuum drying oven for 12 h, to obtain dry powder; and the powder was placed in an air atmosphere for high-temperature calcination, herein the calcination temperature was 900° C., and the temperature holding time was 15 h.

Secondly, according to the stoichiometric ratio in the P2-phase molecular formula, sodium carbonate, magnesium oxide, copper oxide, and manganese dioxide were weighed, and ground fully to obtain a first metal source, 1 g of the first metal source and 20 g of the O3-phase cathode material $NaNi_{0.45}Mn_{0.4}Ti_{0.1}Zn_{0.05}O_2$ were placed in a ball-milling jar, to obtain a first pre-coated particle, herein the ball-milling time was 3 h, and the rotation speed was 450 rmp; the first pre-coated particle sample after ball-milling was placed in a muffle furnace, calcined at 900° C. for 10 h, cooled and ground, to obtain an O3@P2-Phase composite oxide particle with a P2-phase metal oxide coating layer, herein the P2-phase molecular formula was $Na_{0.6}Mg_{0.15}Cu_{0.15}Mn_{0.7}O_2$.

Finally, 10 g of the O3@P2-Phase composite oxide particle with the first coating layer and 0.05 g of $TiO_2$ were placed in the ball-milling jar, to obtain a second pre-coated particle, herein the ball-milling time was 3 h, and the rotation speed was 450 rpm; and the second pre-coated particle sample after ball-milling was placed in the muffle furnace, calcined at 600° C. for 10 h, fully dried and ground, to obtain a layered oxide cathode material with the P2-phase metal oxide coating layer and an inert coating layer, which was marked as a $TiO_2@P2@O3$ layered oxide cathode material.

In the $TiO_2@P2@O3$ layered oxide cathode material, the thickness of the P2-phase metal oxide coating layer was 16 nm, and the thickness of the inert coating layer was 19 nm.

Embodiment 5

Preparation method for layered oxide cathode material:
the only difference between this embodiment and Embodiment 1 was that: the amounts of first metal source and expanded graphite (namely a carbon source) were different. Specifically, the amounts of the first metal source and expanded graphite were changed, so that the weight ratio of the O3-phase nickel-manganese-based oxide layered particle to the first metal source was 1:0.002, and the weight ratio of the O3@P2-phase composite oxide particle to the carbon source was 1:0.002.

In the $G@P2@O3$ layered oxide cathode material obtained, the thickness of the P2-phase metal oxide coating layer was 1.5 nm, and the thickness of the inert coating layer was 1.8 nm.

Embodiment 6

Preparation method for layered oxide cathode material:
the only difference between this embodiment and Embodiment 1 was that: the amounts of first metal source and expanded graphite (namely a carbon source) were different. Specifically, the amounts of the first metal source and expanded graphite were changed, so that the weight ratio of the O3-phase nickel-manganese-based oxide layered particle to the first metal source was 1:0.08, and the weight ratio of the O3@P2-phase composite oxide particle to the carbon source was 1:0.08.

In the $G@P2@O3$ layered oxide cathode material obtained, the thickness of the P2-phase metal oxide coating layer was 125 nm, and the thickness of the inert coating layer was 140 nm.

Embodiment 7

Preparation method for layered oxide cathode material:
the only difference between this embodiment and Embodiment 1 was that: the conditions involved in two times of ball-milling were different, specifically:
for acquiring the first pre-coated particle, the ball-milling time was 5 h, and the rotation speed was 50 rpm; and for acquiring the second pre-coated particle, the ball-milling time was 5 h, and the rotation speed was 50 rpm.

Embodiment 8

Preparation method for layered oxide cathode material:
the only difference between this embodiment and Embodiment 1 was that: the conditions involved in two times of ball-milling were different, specifically:
for acquiring the first pre-coated particle, the ball-milling time was 0.4 h, and the rotation speed was 600 rpm; and for acquiring the second pre-coated particle, the ball-milling time was 0.4 h, and the rotation speed was 600 rpm.

Embodiment 9

Preparation method for layered oxide cathode material:
the only difference between this embodiment and Embodiment 1 was that: the calcination conditions for the first pre-coated particle sample after ball-milling were different, specifically: it was calcined at 500° C. for 22 h.

Embodiment 10

Preparation method for layered oxide cathode material:
the only difference between this embodiment and Embodiment 1 was that: the calcination conditions for the first pre-coated particle sample after ball-milling were different, specifically: it was calcined at 1100° C. for 1 h.

Embodiment 11

Preparation method for layered oxide cathode material:
the only difference between this embodiment and Embodiment 2 was that: the calcination conditions for the second pre-coated particle sample after ball-milling were different, specifically: it was calcined at 300° C. for 22 h.

Embodiment 12

Preparation method for layered oxide cathode material:
the only difference between this embodiment and Embodiment 2 was that: the calcination conditions for the second pre-coated particle sample after ball-milling were different, specifically: it was calcined at 1100° C. for 0.2 h.

Contrast Embodiment 1

Preparation method for layered oxide cathode material:
the only difference between this contrast embodiment and Embodiment 1 was that: the O3-phase cathode material $NaNi_{0.45}Mn_{0.4}Ti_{0.1}Cu_{0.05}O_2$ was not coated in any ways, but was directly used as a cathode material.

Figure 2:
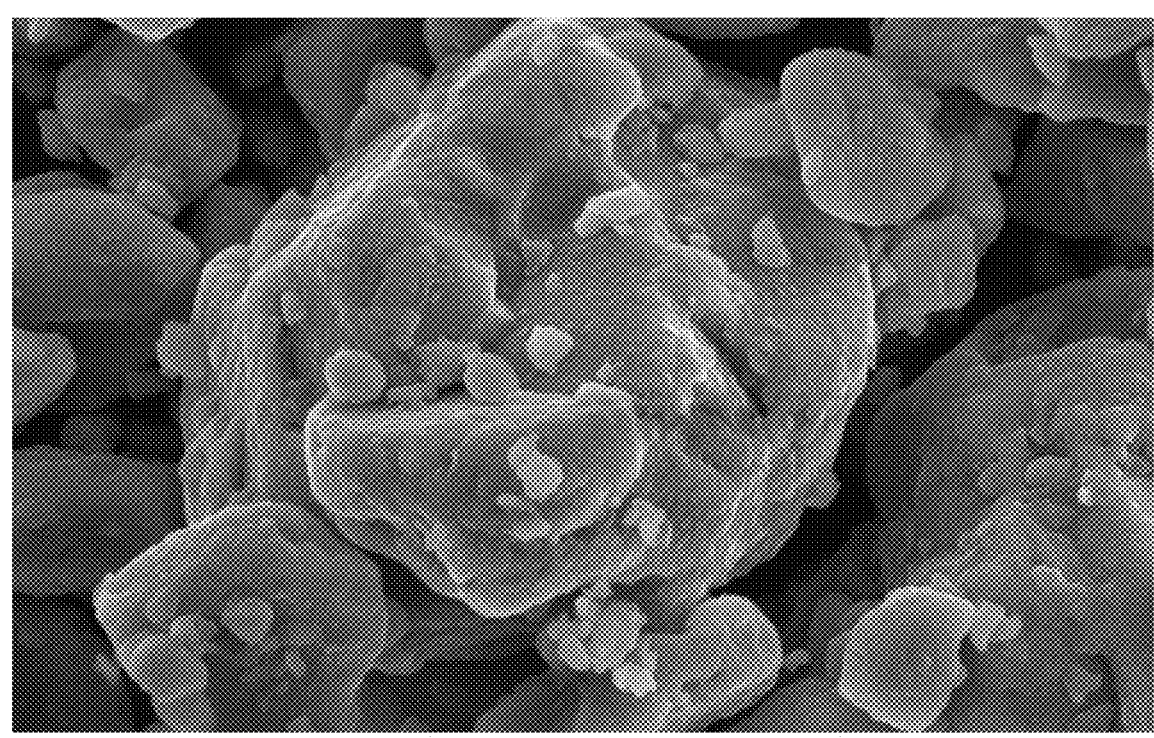
FIG. 2 is a scanning electron microscope image of a layered oxide cathode material obtained in Contrast embodiment 1.
Figure 4:
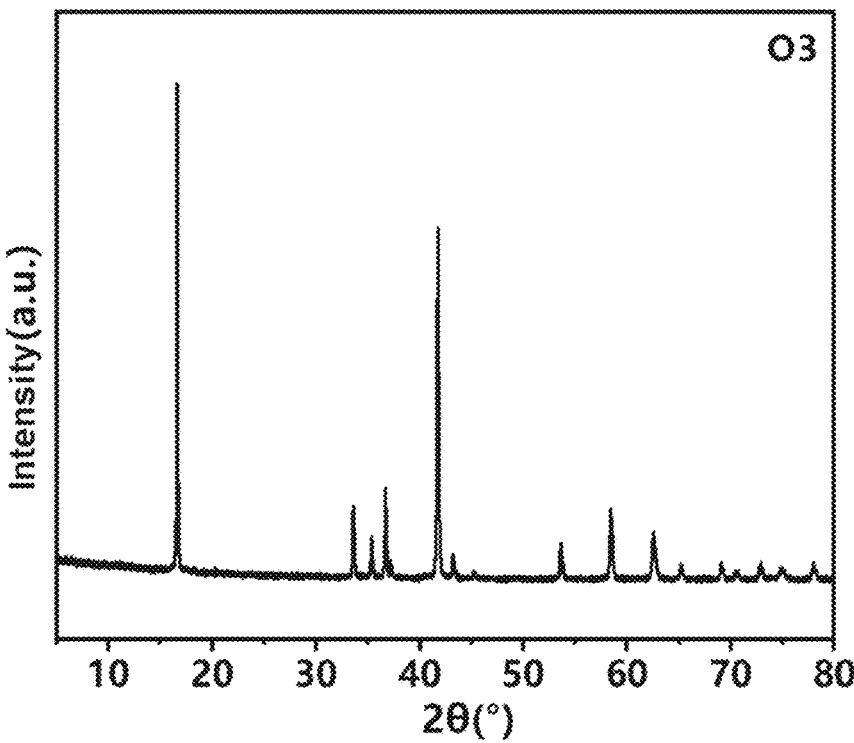
FIG. 4 is an XRD image of the layered oxide cathode material obtained in Contrast embodiment 1.

A scanning electron microscope image of the O3-phase cathode material was shown in FIG. 2, and an XRD test spectrum was shown in FIG. 4.

Contrast Embodiment 2

Preparation method for layered oxide cathode material:

the only difference between this contrast embodiment and Embodiment 1 was that: coating of the inert coating layer was not performed, namely the obtained O3@P2-phase composite oxide particle with the P2-phase metal oxide coating layer was directly used as a cathode material.

Contrast Embodiment 3

Preparation method for layered oxide cathode material:

the only difference between this contrast embodiment and Embodiment 1 was that: coating of the P2-phase metal oxide coating layer was not performed, namely: 10 g of the O3-phase cathode material particle $NaNi_{0.45}Mn_{0.4}Ti_{0.1}Cu_{0.05}O_2$ and 0.2 g of expanded graphite were directly placed in a ball-milling jar, to obtain a pre-coated particle, herein the ball-milling time was 3 h, and the rotation speed was 450 rmp; and the pre-coated particles were fully dried and ground, to obtain a cathode material.

Contrast Embodiment 4

Preparation method for layered oxide cathode material:

the only difference between this contrast embodiment and Embodiment 1 was that: after the O3-phase cathode material $NaNi_{0.45}Mn_{0.4}Ti_{0.1}Cu_{0.05}O_2$ was obtained, a mixture of 1 g of the first metal source and expanded graphite (the weight ratio of the two was 1:1) and 20 g of the O3-phase cathode material $NaNi_{0.45}Mn_{0.4}Ti_{0.1}Cu_{0.05}O_2$ were placed in a ball-milling jar, to obtain a pre-coated particle, herein the ball-milling time was 3 h, and the rotation speed was 450 rmp; and the pre-coated particle sample was placed in a muffle furnace, calcined at 900° C. for 10 h, cooled and ground, to obtain a cathode material.

Namely, the material of the P2-phase metal oxide coating layer was mixed with the material of the inert coating layer as a mixed coating layer for single-layer coating.

Battery Assembly:

(1) Cathode sheet preparation: the layered oxide cathode materials prepared in above embodiments and contrast embodiments, conductive carbon black, and polyvinylidene fluoride (PVDF) were mixed respectively according to a mass ratio of 8:1:1, an appropriate amount of N-methylpyr-rolidone (NMP) was added to form uniform electrode slurry, then the electrode slurry was evenly coated on an aluminum foil, and it was cut into a circular electrode sheet with a diameter of 15 mm after being dried in vacuum, and then transferred to a glove box for standby.

(2) Battery assembly: a sodium metal was used as a counter electrode, a glass fiber was used as a separator, a solute of an electrolyte was sodium perchlorate, and solvents of the electrolyte were propylene carbonate, ethylene car-bonate, and fluoroethylene carbonate (the volume ratio was 1:1:0.05). The concentration of the sodium perchlorate in the electrolyte was 1 mol/L, and a CR2032 button battery was assembled. The entire assembly process was performed in the glove box filled with an argon gas. After the button battery was stilly placed for 6 h, it was used for subsequent electrochemical performance testing.

II. Testing Method

Coverage rate of P2-phase metal oxide coating layer and inert coating layer: the percentage of the area covered by the coating layer to the total surface area of the electrode material was determined by infrared spectroscopy analysis.

Particle size: determined according to GB/T 19077, a particle size analysis laser diffraction method.

Compaction density: determined according to GB/T 24533, a powder compaction density method.

PH value: determined according to GB/T 9724, general rules for pH value determination of chemical reagents.

Moisture content: determined according to GB/T 6283, a Karl Fischer method (general method) for determination of moisture content in chemical products.

Specific surface area: the specific surface area of solid substances was determined according to GB/T 19587, a gas adsorption BET method.

Scanning electron microscope image: it was shot by using ZEISS MERLIN Compact with a magnification of 50 k, as shown in FIGS. 1 and 2.

Electrochemical performance testing: a constant current charging and discharging mode was used, the charging and discharging test was conducted at a current density of 0.1 C, the charging cut-off voltage was 4.2 V, the discharging cut-off voltage was 2.0 V, and the initial charging capacity and discharging capacity and coulombic efficiency of each battery were tested.

Air stability: the cathode materials obtained in the above embodiments and contrast embodiments were exposed to an air environment, and maintained for 24 h, and batteries were prepared by the cathode materials exposed to the air accord-ing to the above way. Its initial charging capacity and discharging capacity and coulombic efficiency were tested.

The particle size distribution and coverage conditions of each layer of the cathode materials obtained in the embodi-ments and contrast embodiments were shown in Table 1, physicochemical performance testing results were shown in Table 2, and electrochemical performance testing results of the further prepared batteries were shown in Table 3.

III. Analysis of Testing Results for Each Embodiment and Contrast Embodiment

TABLE 1

| | Particle size (μm) | | | | | Coverage rate of P2-phase metal oxide coating layer | Coverage rate of inert coating layer |
|---|---|---|---|---|---|---|---|
| | D10 | D50 | D90 | D99 | D100 | | |
| Embodiment 1 | 2.5 | 5.6 | 23.6 | 57.9 | 85.9 | 90% | 88% |
| Embodiment 2 | 2.9 | 5.3 | 25.4 | 54.6 | 78.9 | 85% | 90% |
| Embodiment 3 | 2.3 | 4.9 | 22.1 | 49.6 | 81.2 | 80% | 82% |
| Embodiment 4 | 3.0 | 5.5 | 26.4 | 58.2 | 79.6 | 78% | 80% |
| Embodiment 5 | 2.2 | 4.7 | 22.1 | 47.5 | 71.1 | 72% | 75% |
| Embodiment 6 | 3.8 | 6.6 | 29.3 | 67.4 | 91.2 | 89% | 91% |
| Embodiment 7 | 2.8 | 5.9 | 23.3 | 54.6 | 83.2 | 84% | 87% |

TABLE 1-continued

| | Particle size (μm) | | | | | Coverage rate of P2-phase metal oxide coating layer | Coverage rate of inert coating layer |
|---|---|---|---|---|---|---|---|
| | D10 | D50 | D90 | D99 | D100 | | |
| Embodiment 8 | 3.1 | 5.9 | 24.1 | 59.2 | 81.4 | 84% | 85% |
| Embodiment 9 | 2.6 | 5.6 | 26.5 | 53.4 | 74.1 | 85% | 86% |
| Embodiment 10 | 2.8 | 5.4 | 23.8 | 51.4 | 79.6 | 82% | 84% |
| Embodiment 11 | 3.3 | 5.8 | 27.2 | 48.7 | 76.5 | 85% | 86% |
| Embodiment 12 | 2.9 | 6.0 | 25.9 | 50.6 | 75.4 | 84% | 84% |
| Contrast embodiment 1 | 2.1 | 5.8 | 14.3 | 25.5 | 44.3 | \ | \ |
| Contrast embodiment 2 | 3.2 | 8.2 | 26.1 | 71.4 | 110.9 | 85% | \ |
| Contrast embodiment 3 | 2.5 | 6.1 | 22.5 | 64.3 | 79.5 | \ | 85% |
| Contrast embodiment 4 | 2.9 | 6.3 | 26.5 | 70.2 | 84.6 | 87% | |

TABLE 2

| | | Compaction density (g/cm³) | pH value | Moisture content (ppm) | Specific surface area (m²/g) |
|---|---|---|---|---|---|
| Embodiment 1 | Before exposure | 3.16 | 13.10 | 1038.2 | 2.14 |
| | After exposure | 3.15 | 13.03 | 1063.4 | 0.79 |
| Embodiment 2 | Before exposure | 3.21 | 13.23 | 998.5 | 2.94 |
| | After exposure | 3.25 | 13.27 | 1035.4 | 2.12 |
| Embodiment 3 | Before exposure | 3.84 | 13.15 | 965.2 | 2.74 |
| | After exposure | 3.85 | 13.23 | 1012.7 | 2.51 |
| Embodiment 4 | Before exposure | 3.55 | 13.06 | 1032.3 | 2.45 |
| | After exposure | 3.56 | 13.14 | 1064.7 | 2.33 |
| Embodiment 5 | Before exposure | 3.64 | 13.27 | 1023.4 | 2.64 |
| | After exposure | 3.66 | 13.32 | 1031.1 | 2.42 |
| Embodiment 6 | Before exposure | 3.75 | 13.37 | 1058.2 | 2.54 |
| | After exposure | 3.78 | 13.40 | 1091.4 | 2.52 |
| Embodiment 7 | Before exposure | 3.19 | 13.12 | 1032.5 | 2.12 |
| | After exposure | 3.21 | 13.15 | 1045.7 | 2.07 |
| Embodiment 8 | Before exposure | 3.13 | 13.11 | 1040.5 | 2.17 |
| | After exposure | 3.15 | 13.13 | 1058.7 | 2.15 |
| Embodiment 9 | Before exposure | 3.43 | 13.18 | 1043.5 | 2.17 |
| | After exposure | 3.46 | 13.22 | 1059.9 | 2.18 |
| Embodiment 10 | Before exposure | 3.17 | 13.23 | 1002.5 | 2.28 |
| | After exposure | 3.19 | 13.27 | 1041.7 | 2.25 |
| Embodiment 11 | Before exposure | 3.23 | 13.25 | 1023.5 | 2.16 |
| | After exposure | 3.26 | 13.27 | 1051.2 | 2.19 |
| Embodiment 12 | Before exposure | 3.17 | 13.33 | 1021.3 | 2.23 |
| | After exposure | 3.21 | 13.38 | 1048.6 | 2.21 |
| Contrast embodiment 1 | Before exposure | 3.16 | 13.03 | 1062.4 | 0.78 |
| | After exposure | 3.19 | 13.11 | 1094.2 | 0.65 |
| Contrast embodiment 2 | Before exposure | 3.06 | 13.10 | 498.5 | 1.97 |
| | After exposure | 3.08 | 13.21 | 542.2 | 1.91 |
| Contrast embodiment 3 | Before exposure | 3.15 | 13.12 | 995.9 | 1.79 |
| | After exposure | 3.16 | 13.15 | 1041.8 | 1.65 |
| Contrast embodiment 4 | Before exposure | 3.18 | 13.14 | 1015.4 | 2.04 |
| | After exposure | 3.20 | 13.18 | 1039.8 | 1.98 |

TABLE 3

| | | Initial charging capacity (mAh · g⁻¹) | Initial discharging capacity (mAh · g⁻¹) | Initial coulombic efficiency (%) |
|---|---|---|---|---|
| Embodiment 1 | Before exposure | 159.4 | 147.2 | 92.3 |
| | After exposure | 150.9 | 137.1 | 90.8 |
| Embodiment 2 | Before exposure | 147.2 | 138.7 | 94.2 |
| | After exposure | 142.5 | 133.5 | 93.7 |

TABLE 3-continued

| | | Initial charging capacity (mAh · g$^{-1}$) | Initial discharging capacity (mAh · g$^{-1}$) | Initial coulombic efficiency (%) |
|---|---|---|---|---|
| Embodiment 3 | Before exposure | 145.7 | 132.4 | 90.9 |
| | After exposure | 132.8 | 120.1 | 90.4 |
| Embodiment 4 | Before exposure | 148.6 | 136.6 | 91.9 |
| | After exposure | 137.1 | 123.5 | 90.1 |
| Embodiment 5 | Before exposure | 155.2 | 143.9 | 92.7 |
| | After exposure | 145.5 | 135.2 | 92.9 |
| Embodiment 6 | Before exposure | 153.2 | 140.8 | 91.9 |
| | After exposure | 142.6 | 130.3 | 91.4 |
| Embodiment 7 | Before exposure | 156.7 | 144.2 | 92.0 |
| | After exposure | 151.2 | 135.4 | 89.5 |
| Embodiment 8 | Before exposure | 154.1 | 143.8 | 93.3 |
| | After exposure | 141.6 | 127.4 | 90.0 |
| Embodiment 9 | Before exposure | 157.6 | 145.9 | 92.6 |
| | After exposure | 147.9 | 135.6 | 91.7 |
| Embodiment 10 | Before exposure | 157.1 | 143.9 | 91.6 |
| | After exposure | 146.2 | 131.9 | 90.2 |
| Embodiment 11 | Before exposure | 158.8 | 146.3 | 92.1 |
| | After exposure | 149.4 | 136.2 | 91.2 |
| Embodiment 12 | Before exposure | 157.9 | 145.2 | 92.0 |
| | After exposure | 148.8 | 135.6 | 91.1 |
| Contrast embodiment 1 | Before exposure | 164.1 | 148.8 | 90.7 |
| | After exposure | 121.0 | 95.7 | 79.1 |
| Contrast embodiment 2 | Before exposure | 164.6 | 150.4 | 91.4 |
| | After exposure | 155.8 | 140.2 | 90.0 |
| Contrast embodiment 3 | Before exposure | 158.2 | 144.5 | 91.3 |
| | After exposure | 147.0 | 131.4 | 89.4 |
| Contrast embodiment 4 | Before exposure | 158.2 | 144.1 | 91.1 |
| | After exposure | 148.7 | 131.7 | 88.6 |

From the above results, it may be seen that the above embodiments of the present disclosure achieve the good coating effect, herein the P2-phase metal oxide coating layer reduces the residual alkali content on the surface of the O3-phase nickel-manganese-based layered oxide, while the inert coating layer reduces the side reactions generated between the material surface, the air and the electrolyte. By the above experiments, it is discovered that the double-layer coating of the P2-phase metal oxide coating layer and the inert coating layer affects the particle size, specific surface area, pH value, moisture content, and compaction density and the like of the material. Appropriate nickel-manganese-based cathode materials, coating amounts, and ball-milling conditions make the layered oxide cathode material exhibit higher electrochemical performance and better air stability.

When the layered oxide cathode material is applied to the sodium ion battery, the sodium ion battery prepared has high initial coulombic efficiency, excellent rate performance, long cycle life, and good air stability. In addition, the preparation method for the layered oxide cathode material provided by the present disclosure is simple and practical, suitable for large-scale production, and has a broad application prospect.

It should be noted that the present disclosure is not limited to the above implementation modes. The above implementation modes are only embodiments, and all implementation modes within the scope of the technical schemes of the present disclosure that have the same compositions and play the same effects as the technical concepts are contained in the technical scope of the present disclosure. In addition, in the scope without deviating from the main idea of the present disclosure, various variations that may be thought of by those skilled in the art may be applied to the implementation modes, and other modes constructed by combining some constituent elements of the implementation modes are also contained in the scope of the present disclosure.

What is claimed is:

1. A layered oxide cathode material, wherein the layered oxide cathode material comprises an O3@P2-phase composite oxide particle and an inert coating layer coated on the surface of the O3@P2-phase composite oxide particle, and the O3@P2-phase composite oxide particle comprises an O3-phase nickel-manganese-based oxide layered particle and a P2-phase metal oxide coating layer coated on the surface of the O3-phase nickel-manganese-based oxide layered particle;

wherein, the molecular formula of the O3-phase nickel-manganese-based oxide layered particle is $NaNi_{0.45}Mn_{0.4}Ti_{0.1}Cu_{0.05}O_2$, the molecular formula of the P2-phase metal oxide coating layer is $Na_{0.6}Mg_{0.15}Cu_{0.15}Mn_{0.7}O_2$, and the inert coating layer is a carbon layer; in the layered oxide cathode material, the thickness of the P2-phase metal oxide coating layer is 1.5 nm, and the thickness of the inert coating layer is 1.8 nm;

a coverage rate of the P2-phase metal oxide coating layer on the surface of the O3-phase nickel-manganese-based oxide layered particle is 72%, and a coverage rate of the inert coating layer on the surface of the O3@P2-phase composite oxide particle is 75%.

2. A preparation method for the layered oxide cathode material according to claim 1, wherein the preparation method comprises:

providing an O3-phase nickel-manganese-based oxide layered particle and a first metal source, mixing the O3-phase nickel-manganese-based oxide layered particle with the first metal source, and performing first ball-milling, to obtain a first pre-coated particle;

performing first calcination treatment on the first pre-coated particle, to obtain an O3@P2-phase composite oxide particle;

mixing the O3@P2-phase composite oxide particle with a carbon source, and performing second ball-milling, to obtain a second pre-coated particle; and performing optional second calcination treatment on the second pre-coated particle, to obtain the layered oxide cathode material.

3. The preparation method for the layered oxide cathode material according to claim 2, wherein the rotation speed of the first ball-milling is 100 rpm-500 rpm, and the time is 0.5 h-4 h; and/or, the rotation speed of the second ball-milling is 100 rpm-500 rpm, and the time is 0.5 h-4 h.

4. The preparation method for the layered oxide cathode material according to claim 2, wherein the weight ratio of the O3-phase nickel-manganese-based oxide layered particle to the first metal source is 1: (0.005-0.05), and the weight ratio of the O3@P2-phase composite oxide particle to the carbon source is 1: (0.005-0.05).

5. The preparation method for the layered oxide cathode material according to claim 4, wherein a temperature of the first calcination treatment is 600° C.-1000° C., and the first calcination treatment time is 2 h-20 h; a temperature of the second calcination treatment is 400° C.-1000° C., and the second calcination treatment time is 0.5 h-20 h.

6. The preparation method for the layered oxide cathode material according to claim 5, wherein, when the O3@P2-phase composite oxide particle is mixed with the carbon source, and the carbon source is selected from one or more of coal tar, coal pitch, and petroleum pitch, the second calcination treatment is performed, the temperature of the second calcination treatment is 400° C.-800° C., the second calcination treatment time is 0.5 h-2 h, and the second calcination treatment atmosphere is a nitrogen atmosphere and/or an argon atmosphere; and when the O3@P2-phase composite oxide particle is mixed with the carbon source, and the carbon source is selected from one or more of expanded graphite, carbon black, and graphene, the second calcination treatment is not performed, and the layered oxide cathode material is obtained after the second ball-milling.

7. A cathode sheet, wherein the cathode sheet comprises the layered oxide cathode material according to claim 1.

8. A sodium ion battery, wherein the sodium ion battery comprises the cathode sheet according to claim 7.

9. The layered oxide cathode material according to claim 1, wherein calculated by using the weight of the layered oxide cathode material as 100%, a mass fraction of the P2-phase metal oxide coating layer is 0.5%-5%, and a mass fraction of the inert coating layer is 0.5%-5%.

10. The preparation method for the layered oxide cathode material according to claim 2, wherein the first metal source comprises a sodium source and a coating metal source, the coating metal source is selected from one or more of oxide, hydroxide, carbonate, sulfate, oxalate, acetate, and citrate corresponding to Mg, Cu, and Mn, and the sodium source is selected from one or more of sodium carbonate, sodium hydroxide, sodium nitrate, and sodium peroxide.

11. The preparation method for the layered oxide cathode material according to claim 2, wherein the carbon source is selected from one or more of coal tar, coal pitch, petroleum pitch, expanded graphite, carbon black, and graphene.

12. The preparation method for the layered oxide cathode material according to claim 5, wherein the calcination atmosphere of the first calcination treatment is an air and/or oxygen atmosphere.

* * * * *